(12) United States Patent
Poor

(10) Patent No.: US 7,606,421 B2
(45) Date of Patent: Oct. 20, 2009

(54) DATA EXTRACTION FROM TEMPORAL IMAGE DATA

(75) Inventor: David D. S. Poor, Meadowbrook, PA (US)

(73) Assignee: CTB/McGraw-Hill LLC, Monterey, CA (US)

( * ) Notice: Subject to any disclaimer, the term of this patent is extended or adjusted under 35 U.S.C. 154(b) by 855 days.

(21) Appl. No.: 11/006,547

(22) Filed: Dec. 8, 2004

(65) Prior Publication Data

US 2006/0120605 A1 Jun. 8, 2006

(51) Int. Cl.
*G06K 9/18* (2006.01)

(52) U.S. Cl. .................. 382/186; 345/173; 345/442; 345/443; 382/187; 382/202; 715/863

(58) Field of Classification Search .................. 382/186, 382/187, 190, 202; 707/6; 345/173, 442, 345/443; 715/863
See application file for complete search history.

(56) References Cited

U.S. PATENT DOCUMENTS

| | | | |
|---|---|---|---|
| 4,708,503 A | 11/1987 | Poor | |
| 5,001,330 A | 3/1991 | Koch | |
| 5,001,769 A | 3/1991 | Reid-Green et al. | |
| 5,004,896 A | 4/1991 | Serrell et al. | |
| 5,011,413 A | 4/1991 | Ferris et al. | |
| 5,085,587 A | 2/1992 | DesForges et al. | |
| 5,103,490 A | 4/1992 | McMillin | |
| 5,134,669 A | 7/1992 | Keogh et al. | |
| 5,184,003 A | 2/1993 | McMillin et al. | |
| 5,194,966 A | 3/1993 | Quardt et al. | |
| 5,211,564 A | 5/1993 | Martinez et al. | |
| 5,371,673 A | 12/1994 | Fan | |
| 5,434,931 A | 7/1995 | Quardt et al. | |
| 5,452,379 A | 9/1995 | Poor | |
| 5,672,060 A | 9/1997 | Poor | |
| 5,734,882 A * | 3/1998 | Lopresti et al. | ............. 707/200 |
| 5,809,498 A * | 9/1998 | Lopresti et al. | ................ 707/6 |
| 5,869,789 A | 2/1999 | Reid-Green | |
| 5,970,170 A * | 10/1999 | Kadashevich et al. | ....... 382/187 |
| 6,173,154 B1 | 1/2001 | Kucinski et al. | |
| 6,256,399 B1 | 7/2001 | Poor | |
| 6,366,760 B1 | 4/2002 | Kucinski et al. | |
| 6,459,509 B1 | 10/2002 | Maciey et al. | |
| 6,466,683 B1 | 10/2002 | Poor | |
| 6,552,829 B1 | 4/2003 | Maciey et al. | |
| 6,684,052 B2 | 1/2004 | Kucinski et al. | |
| 6,961,482 B2 | 11/2005 | Knowles | |

(Continued)

FOREIGN PATENT DOCUMENTS

WO    WO 02-15558 A2    2/2002

*Primary Examiner*—Gregory M Desire
(74) *Attorney, Agent, or Firm*—Rothwell, Figg, Ernst & Manbeck PC

(57) ABSTRACT

In a method and system to extract data from handwritten information when the information is captured as sequences of strokes, vectors, or marks, temporal data is stored within the color or gray-scale encoding of pixel values within a bit-mapped image. A bitmapped image is used to create a derived image suitable for data extraction and a method of analyzing the image, including the encoded temporal data, to yield an adjusted image that better reflects the intent of the person who created the handwriting. While the primary application of the invention is in processing handwritten responses to assessment items, the system and method can be advantageously used to extract data from or to improve the presentation of information from an electronic representation of temporal human marks in many applications. Additionally, the system and method can be advantageously used to store and process other types of data within a bitmapped image.

53 Claims, 6 Drawing Sheets

U.S. PATENT DOCUMENTS

| | | |
|---|---|---|
| 6,988,895 B1 | 1/2006 | Lamarche et al. |
| 7,020,435 B2 | 3/2006 | Moulthrop et al. |
| 7,054,464 B2 | 5/2006 | Poor |
| 7,095,979 B2 | 8/2006 | Stout |
| 2002/0097909 A1* | 7/2002 | Perrone et al. ............... 382/187 |
| 2002/0110798 A1 | 8/2002 | Kucinski et al. |
| 2002/0122606 A1 | 9/2002 | Knowles |
| 2003/0086586 A1 | 5/2003 | Poor |
| 2003/0202697 A1* | 10/2003 | Simard et al. ............... 382/195 |
| 2004/0086841 A1 | 5/2004 | Clark et al. |
| 2004/0121298 A1 | 6/2004 | Creamer et al. |
| 2004/0185424 A1 | 9/2004 | Kucinski et al. |
| 2004/0233197 A1* | 11/2004 | Liu et al. ..................... 345/442 |
| 2004/0259067 A1 | 12/2004 | Cody et al. |
| 2006/0120605 A1* | 6/2006 | Poor .......................... 382/186 |
| 2007/0014475 A1* | 1/2007 | Prymus et al. .............. 382/186 |
| 2007/0205261 A1* | 9/2007 | Postnikov et al. ........... 235/379 |

* cited by examiner

FIGURE 2

Initial Phrase yield a very unique —[110]

Complete Phrase yield a ~~truly~~ unique —[120]

Adjusted Phrase yield a truly unique —[130]

Encoding Temporal Data with High Order Color Values

Encoding Temporal Data with 8-bit "Other Information"

DATA EXTRACTION FROM TEMPORAL IMAGE DATA

BACKGROUND OF THE INVENTION

1. Field of the Invention

As disclosed herein, data is extracted from handwritten information when the information is captured as sequences of strokes, vectors, or marks by storing temporal data within the color or gray-scale encoding of pixel values within a bit-mapped image. More particularly, a system and method is provided which relates to such information representing responses to assessment items such as described in the non-provisional patent application by Roger P. Creamer, et al. (Creamer), Ser. No. 10/701,434, which is incorporated herein by reference. The system and method, however, can be advantageously used to extract data from or to improve the presentation of information from electronic representation of temporal human marks including surveys, questionnaires, applications, and the like. Additionally, the system and method can be advantageously used to store other types of data within a bitmapped image.

2. Background Art

As disclosed by Creamer, there are many suitable devices that can be utilized to capture the strokes, vectors, or marks of pencils, pens, stylus, or similar marking instruments as the strokes, vectors, or marks are made by the respondent. Creamer describes a system and method to capture and process handwritten responses to assessment items by human respondents. They disclose how to first present a stimulus to the respondent, such as a test item. They additionally disclose methods and apparatus to obtain an electronic representation of the respondent's handwritten response to the stimulus.

As acknowledged by Creamer, it is often difficult to determine the intended response of a respondent when looking at the response on paper or when looking at a reconstructed image of the response because the respondent can make changes over time. As noted by Creamer, this is true both for selected responses and constructed responses. For a selected response, the respondent makes a mark to select one of a number of options such as with multiple choice items. For a constructed response, the respondent writes or draws or otherwise creates a response to a stimulus such that the response can subsequently be evaluated either by a teacher or evaluator or by a two-step process including conversion to text followed by an automated text evaluation.

While Creamer identifies several different types of apparatus that can be used to capture an electronic representation of the respondent's handwriting, most existing systems merely combine all of the marks into a reconstituted image of the total response. This reconstituted image is appropriate for determining a respondent's intended response when the response is unambiguous. When there are crossed out materials, multiple marks, or other corrections and changes made by the respondent, determining the respondent's intent from the reconstituted response suffers from the same problems as when determining the respondent's intent from paper.

Creamer correctly indicates that the respondent's intent can be more likely properly understood by utilizing the temporal sequence of marks: for example, when more than one answer is marked in a multiple-choice item, the last answer marked can be treated as the intended answer. For constructed response, a respondent's intent may be better determined if some marks are eliminated, such as marks made early on and marks made to cross off earlier mistakes. A system and method is disclosed herein to advantageously utilize both the temporal data and the mark information for determining the respondent's intended response by both automated and human evaluation.

Generally, images containing respondent information are processed by systems designed to extract data from the image representing the marks made by the respondent. A well-known example is "key-from-image" in which a human operator enters data, typically using a keyboard, based on the viewed image. As shown in U.S. Pat. No. 5,672,060 (Poor), constructed responses are often scored by having evaluators or readers view the image of the constructed response on a display and then enter an appropriate score or grade for the student's response. For selected or multiple-choice responses, "image-to-OMR" systems have been developed such as shown by Poor in pending U.S. application 60/224,327 filed Aug. 11, 2000, the disclosure of which is hereby incorporated by reference. Additionally, character recognition systems can be used to convert handwritten characters to text. Examples include the Nestor System from NCS/Pearson, "Eyes and Hands", and "Isirus" by Hewlett-Packard. All of these systems are based on processing traditional bitmapped images.

Traditionally, electronic images can be stored in two different modes: vector representation and bitmapped representation.

In vector representation, the total image is depicted as a series of shapes. These shapes may be lines, circles, dots, or other shapes. When presented together, they depict the entire image. In the current case, each electronic mark can be saved as a separate vector, so that the sequence of vectors in the image may correspond to the temporal sequence of marks made by the respondent. While vector representation can contain the temporal sequence by the sequence of vectors, images stored as vectors tend to be larger than images stored as bitmapped images and tend to require significantly more processing time to display or otherwise process.

In bitmapped images, the total image consists of a matrix of pixels or dots. For the current case, each mark made by a respondent represents one or more pixels. A total image can therefore be created by setting such pixels to represent a mark. The inherent weakness of this traditional process is that when marks overlap, it does not provide a mechanism to identify each individual mark or to determine the sequence of the marks.

One aspect of the system and method disclosed herein is to provide solutions on how to electronically store a single bit-mapped image of a response while maintaining sufficient temporal data to accurately determine the intent of the respondent when the traditional total image is insufficient. An additional aspect of the system and method disclosed herein is to create derivative images from the single bitmapped image suitable for existing data extraction techniques including, but not limited to key-from-image, human evaluation or scoring, character recognition, conversion to text, and scoring of selected responses.

SUMMARY OF THE INVENTION

A system and method is provided to electronically represent handwritten information such that the electronic representation can efficiently and precisely be used to determine the intent of the response and yield accurate data extraction.

The system starts with a sequence of digitally recorded representations of handwritten strokes, vectors, or marks made by a respondent in response to a stimulus. These digital representations of the strokes, vectors, or marks are created by a writing instrument. The writing instrument can either make these digital representations available to the system which creates the electronic representation of the handwritten information as they are created, or the writing instrument can digitally store the digital representations of strokes, vectors, or marks and then transfer them to the system when the creation process is complete. The writing instrument can either be independent of the system or it can be connected to the system.

From this sequence of digitally recorded representations of strokes, vectors, or marks, the system creates a single bit-mapped electronic image representing the total handwritten response by the respondent to the stimulus with some temporal data embedded within the image. By using this process, existing highly efficient image processing methods can be utilized to send images for data extraction from images using existing and future data extraction procedures.

The system and method build a special image which, when viewed, reconstitutes the respondent's handwriting for the entire response. This image is referred to as a "temporal bitmapped image." The temporal bitmapped image is stored in a traditional gray-scale or color bitmapped format, but, within the image, temporal sequence information is embedded within the digital representation of each pixel in the gray-scale value or color value for that pixel.

Initially, the system builds the temporal bitmapped image with all pixels set to white, or no marks. The system then processes the sequence of marks representing the respondent's handwritten response in the same sequence as they were made by the respondent. For each mark, the system assigns a temporal value to the mark to represent the temporal sequence of the mark. If the recording device has an "erasure" feature, the temporal color value is set to white for erasure vectors. If color, darkness, intensity, or similar information is provided for the total mark or the individual points within the stroke, vector, or mark, then that information is extracted and combined with the temporal value to obtain the temporal color value appropriate for each point. If there is no such information, then a single temporal color value is determined for all points within the mark based on the temporal value. Each pixel within the temporal bitmapped image corresponding to the location of the mark is changed to the appropriate assigned temporal color value. Using this sequential processing of marks then, each time a pixel is set, the assigned temporal color value replaces the pixel's previous value, either white or some temporal color value set by an earlier mark. As referred to herein, a "point" corresponds to a particular X-Y location within the handwritten information, and would map, or correspond, to a particular pixel within the created bitmap.

When all marks have been processed, this process automatically sets each pixel's color value to the assigned temporal color value of the last mark made which included the pixel.

The determination and storage of temporal color values can be done for an entire page, or the total area can be divided into specific regions of interest and the temporal color values can be set separately for each region. For example, on an answer document with a series of selected response items, the set of possible responses for each item can be established as a separate region. An equivalent result can be achieved by treating each region as a separate image.

There is no "correct" process or format for the temporal color value, and numerous strategies can be utilized to store the temporal data within the color or darkness value for a pixel.

If there is no time information available, the temporal value for each stroke, vector, or mark can be equal to its sequential position within the sequence of strokes, vectors, or marks. If the count in the sequence is larger than the total number that can be stored for the pixel, the sequence number can be rescaled to fit within the available range.

Alternatively, the temporal value can be incremented only when there are one or more pixels within the mark which already have been set. This strategy ensures the minimum possible number of temporal color values. If the count of such values is larger than the total number that can be stored for the pixel, the image can be broken up into non-overlapping areas and the temporal value can be calculated separately for each area.

If each stroke, vector, or mark is identified with a time designation, the temporal value can be based on the time, such as an offset from the start time of the first stroke. If the total elapsed time will not fit within the range of values available for a pixel, the temporal value can be based on the time rescaled to fit, or strokes made nearly at the same time can be combined into a single temporal value. This last procedure is equivalent to only incrementing the temporal value when there are significant pauses.

Some of the above methods can be combined or other methods to assign temporal values can be adopted.

Each pixel value can be stored in many different storage formats used to digitally represent the pixel including, but not limited to, (a) a single 8-bit value representing 256 different "colors," (b) a single 8-bit value representing 256 different shades of gray, and (c) three 8-bit values representing 256 shades of each of three colors: Red, Green, and Blue. Within each of these, and across other structures to store pixel values, there are multiple sets of data that can be stored within the pixel values.

Temporal Only: The pixel values may store only temporal information with the number of possible temporal values dependent on the number of bits associated with each pixel. With temporal data only, there are 255 available temporal value codes with 8-bit storage formats, and there are 16,777,215 available temporal value codes with 24-bit storage formats. When only temporal values are used directly as the temporal color values, however, the stored image cannot be easily viewed.

Temporal and Color/Intensity: When large number of possible color codes are available, such as with 24-bit storage, the color codes can be used to store both temporal values and color or intensity values. When the encoded stroke, vector, or mark data include color information, for example, some of the high order bits of the color coding can be reserved for color information while the remaining bits can be used for temporal data. By using the high-order four bits for each of the three colors (RGB) to store color information, there are 12 bits available for temporal values, or 4096 possible values. Using this process, a normal image display or print process will display or print the temporal bitmapped image with near-perfect colors while maintaining the temporal data within the stored image.

Similarly, if the recoding device provides intensity or darkness information instead of color, a false-color gray scale can be devised to enable a useful display of the image. In the preferred embodiment of the system, the false-color gray scale is stored in the upper three bits of the three colors in a 24-bit storage, leaving 15 bits available to store temporal data, thereby supporting 32,768 possible values. In the preferred embodiment, this same structure is used for temporal bitmapped images with only mark/no mark designations. In this instance, the three high order bits are off for all temporal color values so that the displayed or printed image will appear black or close to black.

It should be apparent to anyone skilled in the art that this procedure can be expanded to store more than two types of data and applied to numerous other instances which require an image and additional information other than temporal data on points within the image. As described herein, additional information can include, but is certainly not limited to, intensity of a mark, the type of pen/instrument that made a mark, the physical pressure exerted on the pen/instrument, and the number of marks that were made for a particular pixel.

Once the temporal bitmapped image has been created, it can be advantageously used to extract data. Since most data extraction processes are based on bi-tonal, or black and white image processing, the examples here are given for bi-tonal processing, although the system and method can be applied to gray scale or color images as well.

First, all non-white pixels are changed to black and the resulting bi-tonal image is submitted for processing, which is equivalent to the traditional complete image. If there are no cross-outs or overwritten areas, the image will normally be successfully processed and data extracted.

If, however, the data cannot be extracted, the original temporal bitmapped image can be used to selectively present pixels based on the temporal sequence using at least three different strategies. In the first strategy, the original temporal bitmapped image is displayed to a human operator with tools to change the displayed image so that the operator can directly extract the needed data. In the second, the operator determines how to adjust the image so that it can be successfully processed. In the third, an automated system is used to adjust the image.

When the first strategy is used in conjunction with a display system that supports animated palettes, an operator can easily examine alternative presentations of the image by adjusting the palette. In this instance the system first builds a custom palette that can map each temporal color value in the image to a color or gray scale value. By mapping all non-white values to black, the displayed image will be equivalent to the traditional bitmapped image. Then, using sliders or other common image manipulation tools, the operator can change both the colors used to display the image and the displayed pixels. Using one slider or similar tool, earlier marks can be made to not display by mapping them to white. Using another slider or similar tool, the gray-scale value or color of the pixels can be adjusted to represent the temporal values, such as mapping the earliest temporal values in a light gray and systematically varying the darkness of the mapped display until the latest temporal values are mapped to solid black. While this approach adjusts the entire image according to the settings of the tools, the process is extremely fast and the operator can easily make different adjustments to better determine the respondent's intent for different sections.

When a system does not support animated palettes, or when the second strategy is used, the process is somewhat different. Two versions of the image are maintained, the original temporal bitmapped image, and a display image. In this instance, the pixels in the display image are derived from the pixels in the temporal bitmapped image according to settings selected by the operator. As with the palette-based manipulation, the operator can utilize global tools to eliminate early marks and/or to display different colors or gray scale values to visually indicate the temporal sequence on the display. Additionally, however, the operator is able to select specific regions of the image and perform similar manipulations within that specific region. For example, if a respondent writes an entire paragraph and subsequently returns and overwrites a single word, this latter procedure will enable the operator to suppress the earlier pixels from the original word, but not suppress contemporary marks in nearby words. Once the operator feels that the display image correctly represents the respondent's intent, the display image will be released for data extraction by the appropriate human or automated process.

In the third instance, an automated adjustment process will perform similar functions. In a simple embodiment, the adjustment process can examine the entire image and selectively remove pixels corresponding to early marks when those marks are adjacent to or near later marks. In a more sophisticated embodiment the automated adjustment process will work only on specific regions within the image. In this embodiment, after a data extraction process fails, the data extraction process will notify the automated adjustment process of the area in which the data extraction failed so that the adjustment process will only consider a smaller area. After the adjustment process is complete, the adjusted image will be released for data extraction by the appropriate human or automated process.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein:

FIG. 2 shows a series of representations of a single phrase written by a respondent with changes in the phrase over time.

DETAILED DESCRIPTION OF THE EXEMPLARY EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, enterprise technologies, middleware, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, enterprise applications, operating systems, enterprise technologies, middleware, development interfaces, and hardware are omitted so as not to obscure the description of the present invention.

Figure 1:
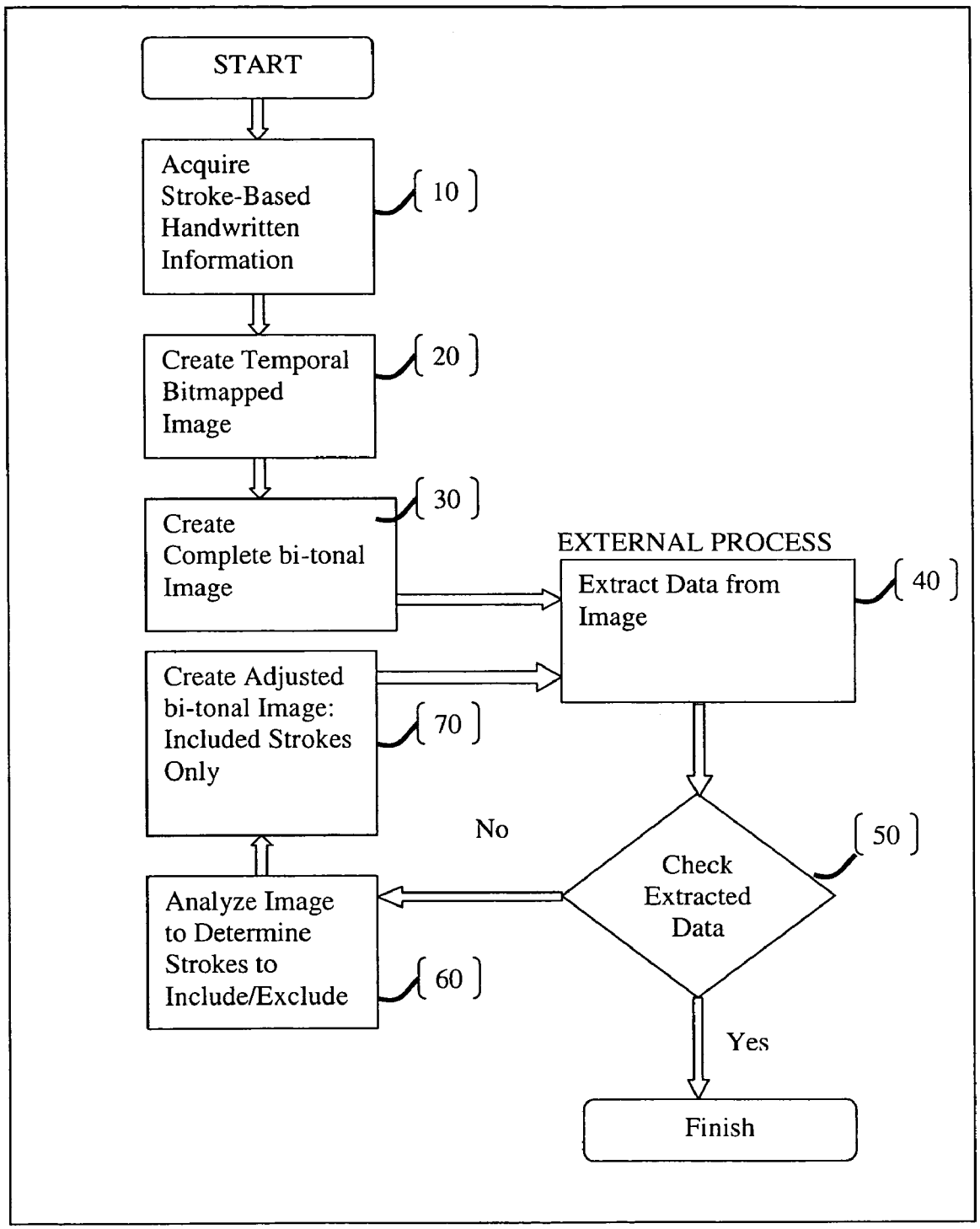
FIG. 1 is a functional block diagram of the architecture for a system for capturing data from handwritten information when the handwritten information is captured as a series of strokes, vectors, or marks.

FIG. 1 is a functional block diagram for a system for capturing data from handwritten information when the handwritten information is captured as a series of strokes, vectors, or marks based on storing temporal information within a bitmapped image. Handwritten responses may include letters, numbers, drawings, graphic symbols and signs, music notation, grammatical operators, mathematical operators, logic operators, check marks, filled in response areas for closed ended questions or demographic data, or the like.

The system is based on the acquisition of handwritten strokes, vectors, or marks (10) from a writing instrument capable of providing a sequence of such stokes, vectors, or marks to represent the complete handwritten information or response. The strokes, vectors, or marks can be acquired by and digitally stored in a device such as the Logitech io Personal Digital Pen, a digital pencil, a digital tablet, a digital stylus, a portable digital notepad, a personal digital assistant (PDA) with a stylus or touch sensitive screen, a personal computer with a mouse, a stylus, or a touch sensitive screen, a digitizing white board, or some other device. In order for the present system to employ such a device, the sequence of stokes, vectors, or marks must be electronically encoded in such a manner that the sequence of strokes, vectors, or marks can be processed by the system. Typically, the electronically encoded sequence of strokes, vectors, or marks is stored in a computer file. The writing instrument can either create the electronic representation directly, or it can digitally store the strokes, vectors, or marks and then transfer them to the system, which then creates the electronic representation. When the strokes, vectors, or marks are created, the writing instrument can either be independent of the system or it can be connected to the system.

The system reads the computer file or otherwise obtains the electronically encoded sequence and creates a temporal bitmapped image based on the strokes, vectors, or marks (20). In the temporal bitmapped image, temporal data or sequence information is stored within the digital representation of each pixel in the color or gray scale values for each pixel within the bitmapped image.

In the preferred embodiment, a bitmapped canvas is first created with all pixels set to white, or no mark. Then each stroke, vector, or mark within the electronically encoded sequence is processed in its temporal sequence as created by the respondent. For each mark, the system assigns a temporal value to the mark to represent the temporal sequence of the mark. In the preferred embodiment of the system if areas of interest or regions are defined within the page, the temporal color values are set independently within each area of interest or region.

In the preferred embodiment of the system when time stamp information is available for each stroke, vector, or mark, the temporal values are assigned as a function of time, otherwise the temporal values are assigned as a function of the ordinal sequence of the stroke, vector, or mark.

Figure 8:
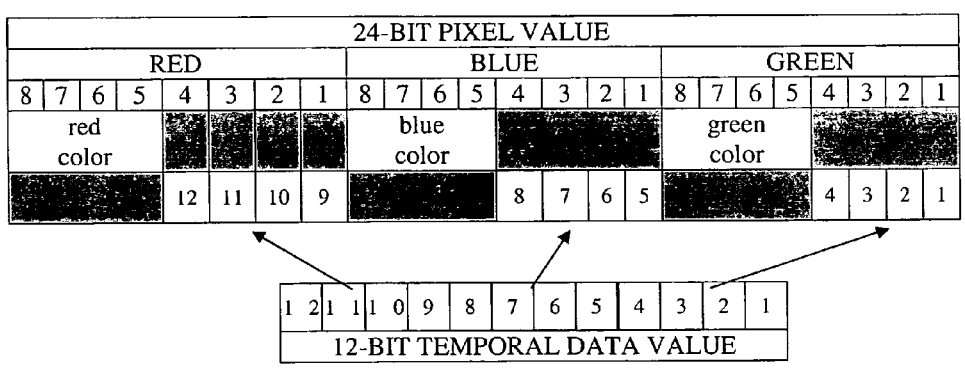
FIG. 8 shows two methods of storing both temporal and display information within a each pixel's stored color values.
Figure 8:
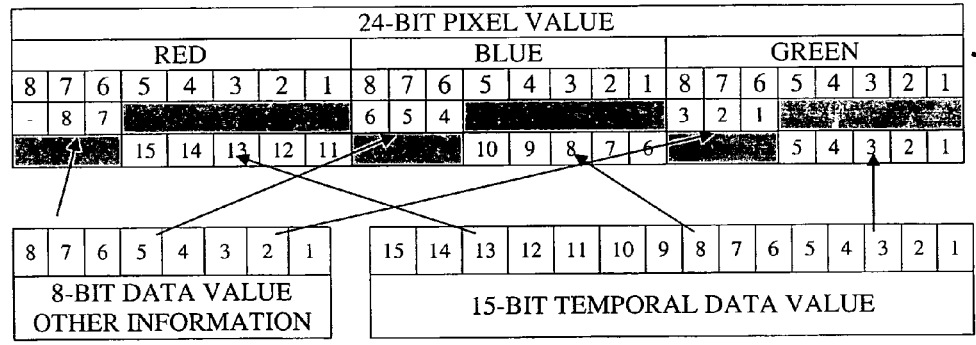

In the preferred embodiment the temporal color values are expressed as 24-bit RGB colors as shown in FIG. 8. When color information is available for each of the three colors, Red, Green, Blue, the high order four bits are reserved for color data and the lower order four bits are used for temporal data (810). With 4 bits from each of three colors there are 12 bits available to store temporal data so that the temporal data can range from 0 to $12^{12}-1$ (4096 possible temporal data values). The high order bits (with the darkness or intensity level) and the lower order bits (with the temporal data values) are then combined to yield the temporal color value. For each stroke, vector, or mark, each pixel within the temporal bitmapped image corresponding to the location of the mark is set to the appropriate temporal color value. When displayed or printed by conventional processes, the temporal bitmapped image yields a color image that appears to be accurate although the temporal data is stored within each pixel's color value.

When color information is not available for each of the three colors, Red, Green, Blue, the high order three bits are reserved for mark intensity and the lower order 5 bits are used for temporal data (820). With 5 bits from each of three colors there are 15 bits available to store temporal data so that the temporal data can range from 0 to $2^{15}-1$ (32,768 possible temporal data values). If the stroke, vector, or mark is further identified with darkness or intensity, the darkness or intensity is encoded in the high order three bits of the three colors with the stipulation that at least one of the three bits be "off" in at least one of the three colors since all bits "on" is typically white. This yields a total of 511 possible intensity or darkness values. If the darkness or intensity is not identified, all three high order bits are set to "000" for all three colors. The high order bits (with the darkness or intensity level) and the lower order bits (with the temporal data values) are then combined to yield the temporal color value. For each stroke, vector, or mark, each pixel within the temporal bitmapped image corresponding to the location of the mark is set to the appropriate temporal color value. When displayed or printed by conventional processes, the temporal bitmapped image yields a false color image for images that contain intensity or darkness information, and an apparent bi-tonal image for images that do not contain intensity or darkness information, although the temporal data is stored within each pixel's color value.

If the recording device has an "erasure" feature, the temporal color value is set to white for erasure vectors.

In the preferred embodiment a copy of the temporal bitmapped image is typically made in which all non-white pixels are changed to black yielding a complete bi-tonal (black and white) image suitable for data extraction (30). This yields a complete image of all the strokes, vectors, and marks made within the image area. Note that the unaltered image can be used for this function if the extraction is being done by a human. If the data extraction engine is capable of utilizing gray-scale or color to improve the extraction process, the copy of the image should provide gray-scale or color information based on the color or gray-scale stored in the temporal image. In many applications, however, it is best to convert the image to a true bi-tonal image even when being evaluated by a human, since the display may not support any storage format other than a 1-bit/pixel image and the larger file size of an 8-bit/pixel, or a 24-bit/pixel image may slow down processing.

If the extraction process can utilize gray-scale images, the complete image can be represented as a 256-gray scale image or other gray scale image wherein the gray scale value is a function of the darkness or intensity values embedded within each pixel.

Once the complete image is created (30), the image is submitted to a process through which desired data is extracted from the image (40). As noted above, this process can be based on human judgments of the handwritten information such as key-from image, or grading of constructed responses. Alternatively, this can include automated processes such as text-from-image and evaluation, image mark reading (IMR) whereby the presence of marks in predetermined locations is detected and analyzed, Intelligent Character Recognition, or other processes.

Normally, if the respondent has made clear and unambiguous marks, such a process will yield good data. However, when the respondent has made ambiguous marks, the data extraction process is likely to fail to completely extract the data. The system, therefore, needs to check the extracted data (50).

If the data extraction was successful, the process is complete. If, however, the extraction process was not successful, the system goes through a two-step process to adjust the image so that the data extraction can be repeated with a successful outcome.

In the first step the temporal bitmapped image is analyzed to determine which strokes, vectors, or marks should be included and which should be excluded (60). This analysis and determination can be done by a human operator or through an automated system.

For either human or automated processing, the purpose of the analysis is to determine which strokes, vectors, or marks should be removed because they represent early marks that were subsequently superceded with later marks. For human determination the human operator is provided tools to use to selectively remove earlier strokes, vectors, or marks from selected regions of the image or from the entire image. For automated processes the removal can be based on the entire image or on pixels which are close together within the image but with highly divergent temporal data.

Once the analysis is complete, an adjusted bi-tonal image is created from the temporal bitmapped image (70). This adjusted bi-tonal image is differentiated from the original complete bi-tonal image, in which all non-white pixels in the temporal bitmapped image were set to black. The adjusted bi-tonal image does not contain the pixels for which their strokes were removed based on their temporal data.

If the data extraction process (50) can advantageously utilize gray-scale or color images, the adjusted bi-tonal image can be created (70) with gray scale values based on the darkness or intensity values within the temporal color values or with color values based on the color values stored within the temporal color values.

In a well constructed system, the progression from data extraction (40) through analysis (60), creation of a new adjusted bi-tonal image (70), and back through data extraction should be controlled by a workflow subsystem. The flow should be based on the image being processed and the available analysis and data extraction options. For example, for some types of images there may be multiple data extraction engines that can be used for the same image and the workflow subsystem should pick the best option based on the information on the specific image being processed. Similarly, some images may always require human analysis while others can first be submitted to an automated analysis process and only be submitted for human analysis if the data extraction is not successful after an automated analysis. It is the responsibility of the workflow subsystem to determine appropriate stopping criteria.

While the preferred embodiment extracts the complete bi-tonal image from the temporal bitmapped image (30) after the temporal bitmapped image is created (20), it should be evident to those practiced in the art that other sequences can be used. For example, the complete image can be derived directly from the electronically encoded sequence of strokes, vectors, or marks and then submitted to the data extraction process (40) before the temporal bitmapped image is created.

FIG. 2 shows a series of representations of a single phrase written by a respondent with changes in the phrase over time. In this example, the respondent first wrote the phrase "yield a very unique," as is shown in the first part of the figure (110). Sometime later, the respondent sought to remove the grammatical error, crossed out the word "very," and wrote over it the word "truly" (120). Using the system described herein within the area of the third word of the phrase, the early marks can be removed yielding the respondent's intended final phrase "yield a truly unique" as shown at the bottom of the figure (130).

Figure 3:
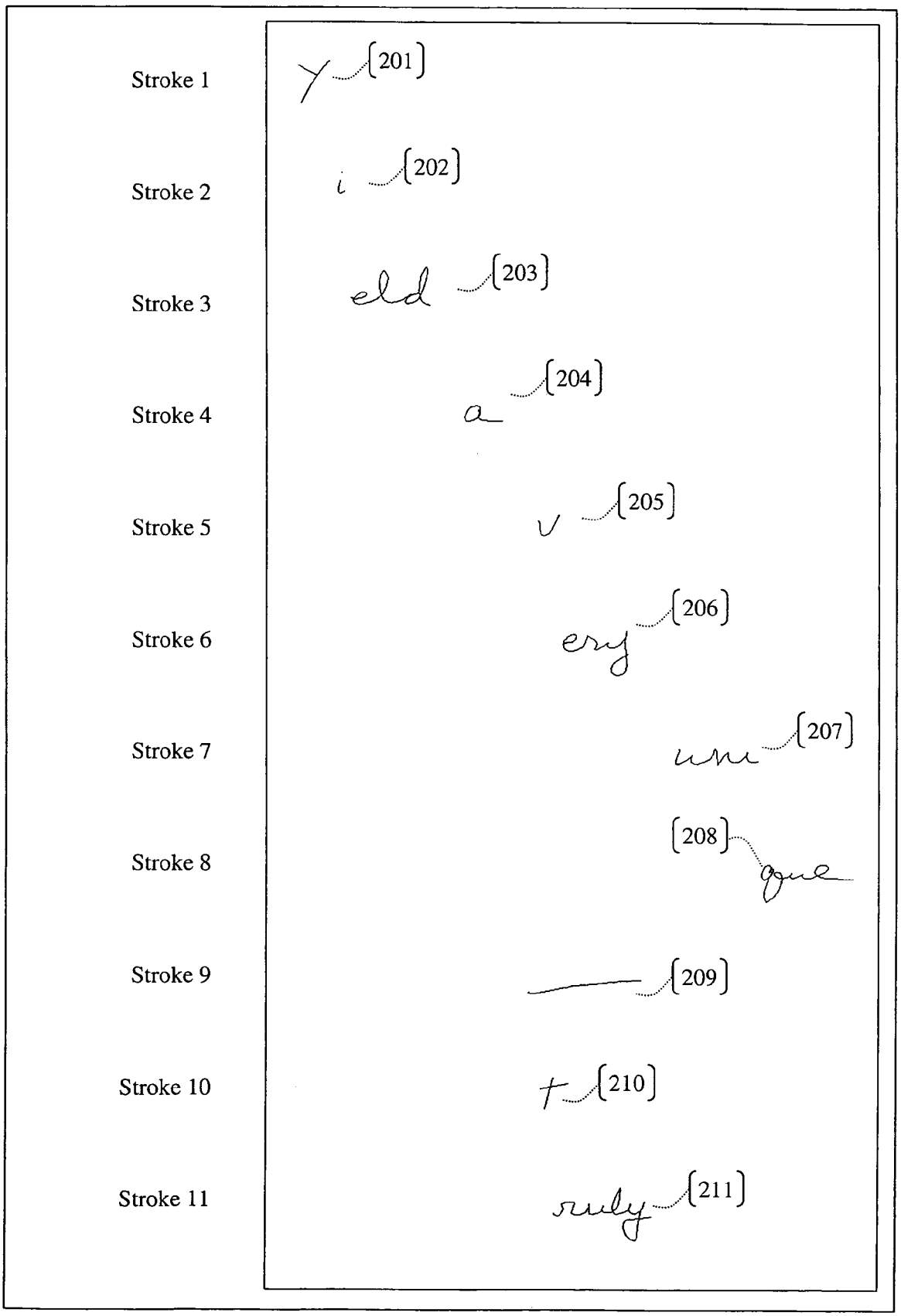
FIG. 3 shows a series of temporal marks which are the basis of the phrase shown in FIG. 2.

FIG. 3 shows a series of temporal marks which are the basis of the phrase shown in FIG. 2. From the top to the bottom of this figure each of the separate strokes by the respondent are shown as 201 through 211 (note that the separate dots over "I" and cross over "t" have been combined with their respective letters for simplicity of presentation). The strokes are presented in time sequence as they were recorded in the electronic encoding of the strokes.

Figure 4:
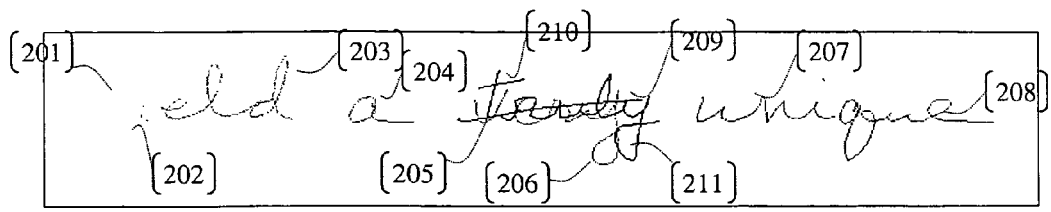
FIG. 4 shows a temporal bitmapped image from the temporal marks shown in FIG. 3.

FIG. 4 shows a temporal bitmapped image from the temporal marks shown in FIG. 3. In order to visually demonstrate the concept of the temporal color values, each successive stroke (201 through 211) is shown in a successively darker shade. Such changing of the colors, however, would normally appear only if the temporal bitmapped image was being displayed on a computer screen as part of the analysis described above and illustrated in FIG. 1 (60).

Figure 5:
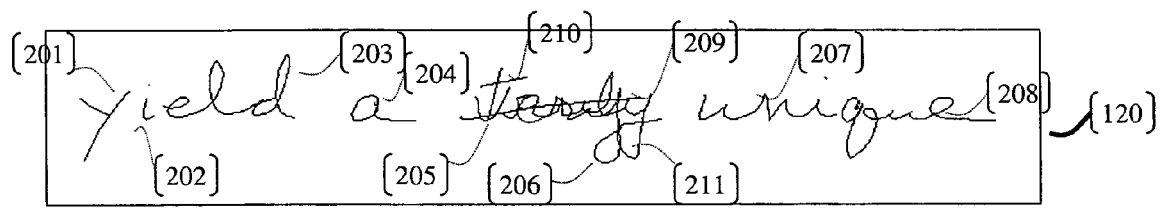
FIG. 5 shows a traditional combined bi-tonal image from the temporal marks shown in FIG. 3.

FIG. 5 shows a traditional combined image from the temporal marks shown in FIG. 3. This image is set to be appropriate for a data extraction process utilizing bi-tonal images, so each stroke (201-211) is represented as black.

Figure 6:
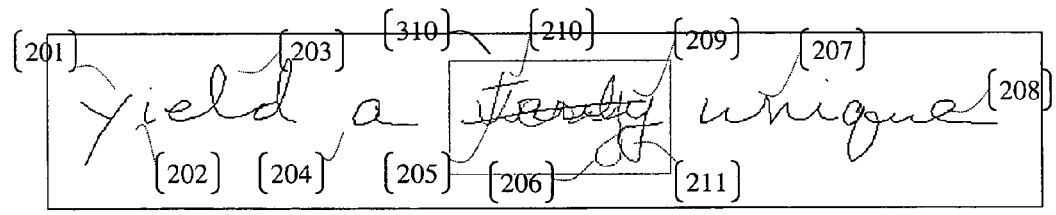
FIG. 6 represents a display image derived from the temporal bitmapped image shown in FIG. 4 as it might be viewed by an operator.

FIG. 6 represents a display image derived from the temporal bitmapped image shown in FIG. 4 as it might be viewed by an operator. In this representation, the operator has put a rectangular area selection (310) around the third word. All strokes outside the box (201-204, 207-208) are represented as black, but the strokes within the box (205-206, 209-211) are represented by different shades of gray with increasingly dark representation later strokes. Using this display, the operator can identify which strokes to remove from the adjusted image, in this case the stroke to draw the line through "very" (209) and the strokes to write the word "very" (205, 206).

Figure 7:
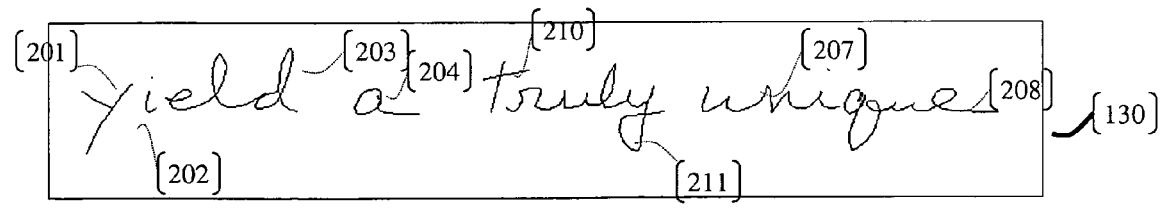
FIG. 7 shows an adjusted bi-tonal image derived from the temporal bitmapped image shown in FIG. 4.

FIG. 7 shows an adjusted bi-tonal image derived from the temporal bitmapped image shown in FIG. 4. The analysis process has eliminated strokes 205, 206 and 209.

FIG. 8 shows two methods of storing both display information and temporal information within the color codes within a bitmapped image. In the top of the figure, the storage format appropriate for a color-coded image is presented (810). In this instance, the high order four bits of the three color sets (Red, Green, and Blue) are used to store color data and the low order four bits are used to store temporal data. In the bottom of the figure the storage format is appropriate for a false-color display of gray-scale, intensity, or values representing additional information other than temporal data (820). This storage format is also appropriate for bi-tonal data by setting the "additional information" to zero for all pixels. In this instance the high order three bits of the three color sets are used to store intensity or darkness values, or are set to "000" for bi-tonal data. The low order five bits of each of the three color sets are used to store temporal data. As discussed above, additional information can include, but is certainly not limited to, intensity of a mark, the type of pen/instrument that made a mark, the physical pressure exerted on the pen/instrument, and the number of marks that were made for a particular pixel.

Figure 9:
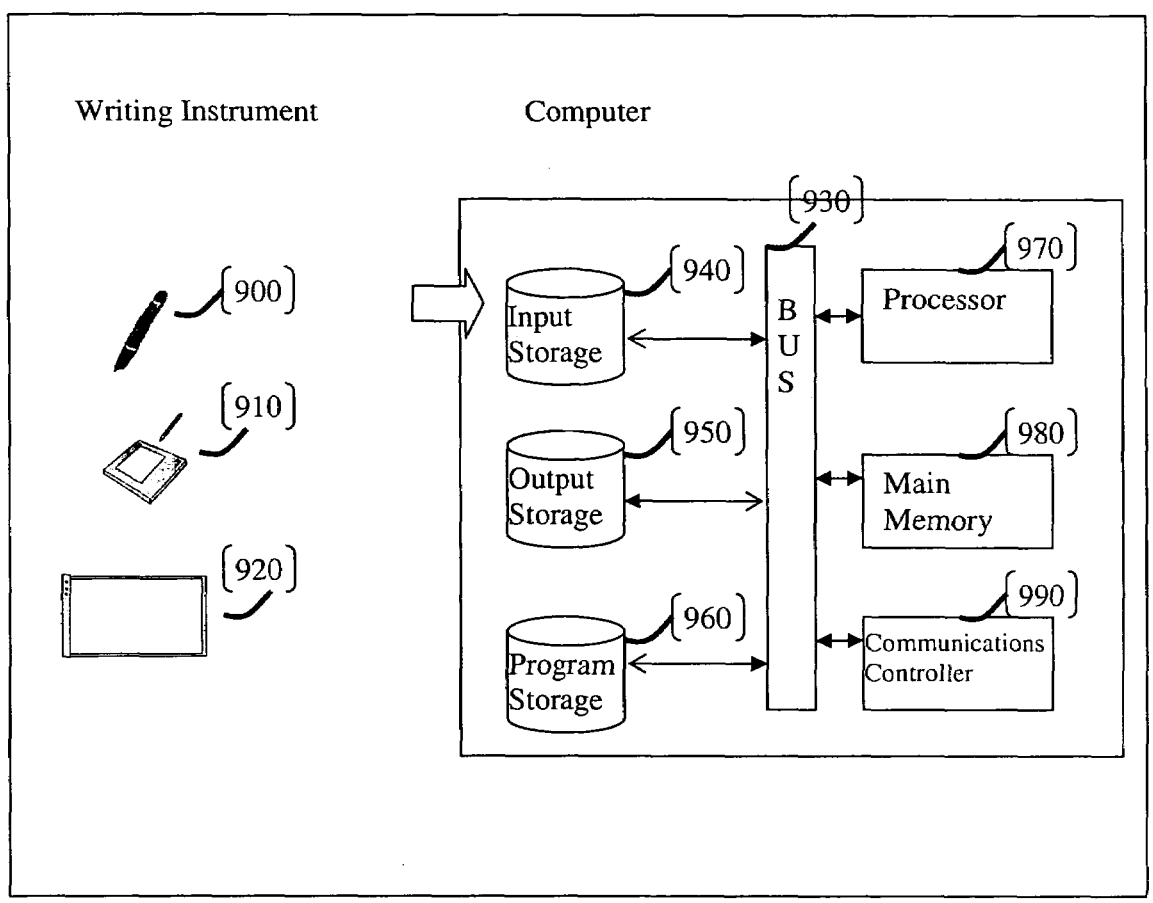
FIG. 9 is a block diagram of writing instruments and an exemplary computer system for implementing the system and methodology disclosed herein.

FIG. 9 is a block diagram of writing instruments and an exemplary computer system for implementing the system and methodology disclosed herein. Any one of the writing instruments (900 through 920) can be used to create the digital representations of the strokes, lines, and marks that makeup the handwriting. The computer system has an input storage component (940) which is capable of storing the digital representations of the strokes, lines, and marks. Depending on the particular embodiment selected, such storage could be (1) a removable memory device such as an optical disk, a read-write CD-ROM, a read-write DVD-ROM, a floppy disk, a magnetic tape, a cartridge, a memory chip, a "Memory Stick," a flash card, a microdrive, or a USB memory module, (2) a memory device contained within the computer such as a hard drive, (3) temporary RAM within the computer, or (4) some other memory system attached to the computer. Depending on the particular embodiment of the application, the digitized representation of the strokes can be transferred from the writing instrument to the input storage (940) in real time as the strokes are recorded, asynchronously, or sequentially, i.e., after a set of digitized representations has been created. Depending on the particular embodiment, additional components of the computer system may need to be employed to effect the transfer from an external device, typically a communications controller (990) which is contained within the computer and delivers information to and/or from an external device.

Within the computer, there is at least one processor (970) which is connected to the input storage component (940), typically through a bus (930) with a hardware-specific controller between the bus and the storage component. Within the computer there is also a main memory (980), typically random access memory which is also connected to the processor through the same bus. The computer also contains an output storage component (950), typically connected to the same bus through a hardware specific controller. The output storage component may be (1) a removable drive such as an optical disk, a read-write CD-ROM, a read-write DVD-ROM, a floppy disk, a magnetic tape, a cartridge, a memory chip, a "Memory Stick," a flash card, a microdrive, or a USB memory module, or (2) an internal hard drive, or (3) some other non-volatile storage device. Depending on the implementation, the output storage component (950) may or may not be the same as the input storage component (940). Within the computer there is also a program storage device (960), typically connected to the same bus via an appropriate hardware specific controller. The program store device may be (1) a removable memory device such as listed above, (2) a non-volatile memory storage device such as a hard drive or ROM, or (3) some other non-volatile storage device. Depending on the implementation, the program storage device may or may not share a device used for input storage or output storage.

One specific example of a suitable computer system would be a standard personal computer attached to a writing instrument via a USB port and cable. In this example, the input storage can be the main computer memory (RAM), the output storage can be the main computer hard drive, and the program storage can also be the main computer hard drive. A second specific example would be a specialized "appliance". This example might utilize a writing instrument which transmits its results to the appliance through a wireless connection after all of the data have been collected. In this appliance, the input storage may be RAM while the program storage device is in dedicated ROM, and the output storage device is a removable memory device such as a writable CD. After reading this description, it will become apparent to a person skilled in the relevant art how to implement the method disclosed herein using other computer systems and configurations.

Once the digitized representations of the strokes or marks has been stored within the input storage, the processor executes a series of steps to convert the sequence of digitized representations of the individual strokes, marks, into an appropriate single image. These steps are collectively referred to as the "software" or "computer program" that embodies the method disclosed herein. Typically the software is retrieved from the program storage device and stored in the computer system main memory. Following the series of steps in the software, the processor retrieves the series of digitized representations of the strokes, builds the consolidated temporal image of the written material, and saves the final image to the output storage device. Anyone skilled in the art will also recognize that the functions of the method disclosed herein can be spread over multiple processors.

As disclosed herein, data is extracted from handwritten information when the information is captured as sequences of strokes, vectors, or marks by storing temporal data within the color or gray-scale encoding of pixel values within a bit-mapped image. While the system and method disclosed herein is primarily directed to educational assessments, it can be advantageously applied to other applications that require combining display information with temporal or other data for each pixel or set of pixels within a bitmapped image.

The foregoing has described the principles, embodiments, and modes of operation of the invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

What is claimed is:

1. A computerized method of embedding temporal data for handwritten information within a bitmapped image of the handwritten information, said method comprising the steps of:
   creating an electronic representation for each stroke, vector, or mark of the handwritten information;
   creating a bitmapped image of the handwritten information, the bitmapped image having background and non-background pixels, wherein at least one non-background pixel within the bitmapped image has a color or gray scale value and corresponds to a point within the electronic representation; and
   using a computer to store a temporal data value within the color or gray scale value for the non-background pixel.

2. The computerized method of claim 1 in which at least some of the handwritten information represents at least one response to a stimulus in an assessment.

3. The computerized method of claim 2 in which the at least one response is a constructed response.

4. The computerized method of claim 2 in which the at least one response is one or more strokes, vectors, or marks that indicate a selection to a response item.

5. The computerized method of claim 1 in which the temporal data is a function of a sequential position of the stroke, vector or mark in the handwritten information.

6. The computerized method of claim 5 in which the temporal data is scaled.

7. The computerized method of claim 1 in which the temporal data is a function of a time at which the electronic representation was created.

8. The computerized method of claim 7, in which the temporal data is scaled.

9. The computerized method of claim 1 in which the background pixel color is white.

10. The computerized method of claim 1 in which erasure vectors are represented by color or gray scale values set to white.

11. The computerized method of claim 1, wherein the color or gray scale value is defined by a plurality of bits in a digital representation of the non-background pixel and the step of using a computer to store a temporal data value within the color or gray scale value for the non-background pixel comprises the steps of:
assigning the color or gray scale value to at least one bit in the digital representation of the non-background pixel; and
assigning the temporal data to remaining bits in the digital representation of the non-background pixel.

12. The computerized method of claim 11, wherein the color or gray scale value is assigned to high order bits in the digital representation of the non-background pixel and the temporal data is assigned to low order bits in the digital representation of the non-background pixel.

13. The computerized method of claim 1, wherein the color or gray scale value is defined by a plurality of bits in a digital representation of the non-background pixel and wherein additional information other than temporal data is stored in the at least one non-background pixel, said method further comprising the steps of:
assigning at least one numerical value to the additional information;
assigning the at least one numerical value to at least one bit in the digital representation of the non-background pixel; and
assigning the temporal data to remaining bits in the digital representation of the non-background pixel.

14. The computerized method of claim 13, wherein the additional information is an intensity of the stroke, vector or mark, a type of instrument that made a stroke, vector or mark, physical pressure exerted on an instrument that made a stroke, vector or mark, or a number of strokes, vectors or marks that were made for the non-background pixel.

15. A computerized method of creating a derived image, comprising the steps of:
embedding temporal data for handwritten information within a bitmapped image of handwritten information according to the method of claim 1; and
creating a derived image of all non-background pixels represented without temporal data.

16. The computerized method of claim 15, further comprising the step of extracting data from the derived image.

17. The computerized method of claim 16, wherein the step of extracting data is conducted manually or automatically and includes at least one of key-from-image, human evaluation or scoring, character recognition, conversion to text, and scoring of selected responses.

18. A computerized method of representing handwritten information in a manner that represents the intent of a person who created the handwritten information, comprising the steps of:
embedding temporal data for the handwritten information according to the method of claim 1;
processing the electronic representations in the same sequence as a temporal sequence of the creation of the stroke, vector, or mark so that each non-background pixel within the bitmapped image is represented by a last temporal stroke, vector, or mark of handwritten information which includes the point corresponding to the non-background pixel; and
creating an adjusted bitmapped image by selectively including or excluding the electronic representations based on their temporal sequence.

19. The computerized method of claim 18, wherein the step of creating the adjusted bitmapped image further comprises the step of creating a display image of the bitmapped image in which an analyst can see false color representations that represent the temporal sequence of the electronic representations for either the entire display image or for selected regions of the display image.

20. The computerized method of claim 19 in which the analyst can further identify specific instances or ranges of temporal data values for inclusion or exclusion in the display image.

21. The computerized method of claim 18, wherein the method is performed automatically by a computer system.

22. The computerized method of claim 1, wherein the stroke, vector or mark is digitally stored in a writing instrument before the electronic representation is created.

23. The computerized method of claim 22, wherein the writing instrument is a digital pencil, a digital pen, a digital stylus, a digital tablet, a digital notepad, a digitizing white board, a personal digital assistant having a stylus or a touch-sensitive screen, or a computer system with a mouse, a stylus, or a touch-sensitive screen.

24. A computer readable program storage medium embodying instructions executable by a computer system for embedding temporal data for handwritten information within a bitmapped image of the handwritten information, the instructions being executable by the computer system to:
read an electronic representation for each stroke, vector, or mark of the handwritten information into main memory or secondary memory of the computer system;
create a bitmapped image of the handwritten information, the bitmapped image having background and non-background pixels, wherein at least one non-background pixel within the bitmapped image has a color or gray scale value and corresponds to a point within the electronic representation; and
store a temporal data value within the color or gray scale value for the non-background pixel.

25. The computer readable program storage medium according to claim 24, wherein the main memory is random access memory.

26. The computer readable program storage medium according to claim 24, wherein the secondary memory is a hard disk drive or a removable storage device.

27. The computer readable program storage medium according to claim 26, wherein the removable storage device is an optical disk, a read-write CD-ROM, a read-write DVD-ROM, a floppy disk, a magnetic tape, a cartridge, a memory chip, a "Memory Stick," a flash card, a microdrive, or a USB memory module.

28. The computer readable program storage medium according to claim 24, wherein the stroke, vector, or mark is digitally stored in a writing instrument.

29. The computer readable program storage medium according to claim 28, wherein the writing instrument is a digital pencil, a digital pen, a digital stylus, a digital tablet, a digital notepad, a digitizing white board, a personal digital assistant having a stylus or a touch-sensitive screen, or a computer system with a mouse, a stylus, or a touch-sensitive screen.

30. The computer readable program storage medium according to claim 28, wherein the writing instrument is not connected to the computer system when the stroke, vector or mark is digitally stored in the writing instrument.

31. The computer readable program storage medium according to claim 28, wherein the writing instrument is connected to the computer system when the stroke, vector or mark is digitally stored in the writing instrument.

32. The computer readable program storage medium according to claim 28, wherein the writing instrument creates the electronic representation.

33. The computer readable program storage medium according to claim 28, wherein the computer system creates the electronic representation.

34. The computer readable program storage medium according to claim 24, wherein at least some of the handwritten information represents at least one response to a stimulus in an assessment.

35. The computer readable program storage medium according to claim 34, wherein the at least one response is a constructed response.

36. The computer readable program storage medium according to claim 34, wherein the at least one response is one or more strokes, vectors, or marks that indicate a selection to a response item.

37. The computer readable program storage medium according to claim 24, wherein the temporal data is a function of a sequential position of the stroke, vector or mark in the handwritten information.

38. The computer readable program storage medium according to claim 37, wherein the temporal data is scaled.

39. The computer readable program storage medium according to claim 24, wherein the temporal data is a function of a time at which the electronic representation was created.

40. The computer readable program storage medium according to claim 39, wherein the temporal data is scaled.

41. The computer readable program storage medium according to claim 24, wherein the background pixel color is white.

42. The computer readable program storage medium according to claim 24, wherein erasure vectors are represented by color or gray scale values set to white.

43. The computer readable program storage medium according to claim 24, wherein the instructions are further executable by the computer system to:
define the color or gray scale value by a plurality of bits in a digital representation of the non-background pixel; and
store a temporal data value within the color or gray scale value for the non-background pixel by assigning the color or gray scale value to at least one bit in the digital representation of the non-background pixel and assigning the temporal data to remaining bits in the digital representation of the non-background pixel.

44. The computer readable program storage medium according to claim 43, wherein the color or gray scale value is assigned to high order bits in the digital representation of the non-background pixel and the temporal data is assigned to low order bits in the digital representation of the non-background pixel.

45. The computer readable program storage medium according to claim 24, wherein the color or gray scale value is defined by a plurality of bits in a digital representation of the non-background pixel and wherein additional information other than temporal data is stored in the at least one non-background pixel, the instructions further executable by the computer system to:
assign at least one numerical value to the additional information;
assign the at least one numerical value to at least one bit in the digital representation of the non-background pixel; and
assign the temporal data to remaining bits in the digital representation of the non-background pixel.

46. The computer readable program storage medium according to claim 45, wherein the at least one numerical value is assigned to high order bits in the digital representation of the non-background pixel and the temporal data is assigned to low order bits in the digital representation of the non-background pixel.

47. The computer readable program storage medium according to claim 45, wherein the additional information is an intensity of the stroke, vector or mark, a type of instrument that made a stroke, vector or mark, physical pressure exerted on an instrument that made a stroke, vector or mark, or a number of strokes, vectors or marks that were made for the non-background pixel.

48. A computer readable program storage medium embodying instructions executable by a computer system for creating a derived composite image, the instructions being executable by the computer system to:
embed temporal data for handwritten information within a bitmapped image of handwritten information according to claim 24; and
create a derived composite image of all non-background pixels represented without temporal data.

49. The computer readable program storage medium according to claim 48, wherein the instructions are further executable by the computer system to extract data from the derived composite image.

50. The computer readable program storage medium according to claim 49, wherein the data includes at least one of key-from-image, human evaluation or scoring, character recognition, conversion to text, and scoring of selected responses.

51. A computer readable program storage medium embodying instructions executable by a computer system for representing handwritten information in a manner that represents the intent of a person who created the handwritten information, the instructions being executable by the computer system to:
embed temporal data for the handwritten information according to claim 24;
process the electronic representations in the same sequence as a temporal sequence of the creation of the stroke, vector, or mark so that each non-background pixel within the bitmapped image is represented by a last temporal stroke, vector, or mark of handwritten information which includes the point corresponding to the non-background pixel; and
create an adjusted bitmapped image by selectively including or excluding the electronic representations based on their temporal sequence.

52. The computer readable program storage medium according to claim 51, wherein the instructions are further executable by the computer system to create a display image of the bitmapped image in which an analyst can see false color representations that represent the temporal sequence of the electronic representations for either the entire display image or for selected regions of the display image.

53. The computer readable program storage medium according to claim 52, wherein the analyst can further identify specific instances or ranges of temporal data values for inclusion or exclusion in the display image.

* * * * *

UNITED STATES PATENT AND TRADEMARK OFFICE
CERTIFICATE OF CORRECTION

| | |
|---|---|
| PATENT NO. | : 7,606,421 B2 |
| APPLICATION NO. | : 11/006547 |
| DATED | : October 20, 2009 |
| INVENTOR(S) | : David D. S. Poor |

It is certified that error appears in the above-identified patent and that said Letters Patent is hereby corrected as shown below:

Specification:
Col. 8, line 6, change "$12^{12}$" to --$2^{12}$--

Col. 11, line 50, change "store" to --storage--

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,606,421 B2 Page 1 of 1
APPLICATION NO. : 11/006547
DATED : October 20, 2009
INVENTOR(S) : David D. S. Poor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1350 days.

Signed and Sealed this

Twelfth Day of October, 2010

David J. Kappos
*Director of the United States Patent and Trademark Office*